(12) United States Patent
Lu et al.

(10) Patent No.: US 8,320,834 B2
(45) Date of Patent: Nov. 27, 2012

(54) INTER-CELL INTERFERENCE MITIGATION SIGNALLING METHODS AND APPARATUS

(75) Inventors: Yanling Lu, Beijing (CN); Luciano Sarperi, Hayes Middlesex (GB); Kevin Power, West Drayton Middlesex (GB); Mythri Hunukumbure, Hillingdon Middlesex (GB)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 12/574,344

(22) Filed: Oct. 6, 2009

(65) Prior Publication Data

US 2010/0099450 A1    Apr. 22, 2010

(30) Foreign Application Priority Data

Oct. 21, 2008 (EP) .................................. 08167168

(51) Int. Cl.
*H04B 1/00* (2006.01)
*H04B 15/00* (2006.01)

(52) U.S. Cl. .............. 455/63.1; 455/67.13; 455/450; 455/501; 455/452.2; 455/436; 455/442; 455/562.1; 370/329; 370/331; 370/436; 375/347; 375/348

(58) Field of Classification Search .......... 455/63.1, 455/67.13, 501, 450, 452.2, 562.1, 436, 442; 370/328–329, 331, 436; 375/347–348
See application file for complete search history.

(56) References Cited

U.S. PATENT DOCUMENTS

| | | | | |
|---|---|---|---|---|
| 6,483,826 B1 * | 11/2002 | Akerberg | ...................... | 370/335 |
| 6,836,673 B1 * | 12/2004 | Trott | .......................... | 455/562.1 |
| 7,039,417 B2 * | 5/2006 | Lyle et al. | ................... | 455/452.2 |
| 7,046,648 B2 * | 5/2006 | Zhang et al. | .................. | 370/331 |
| 7,299,048 B2 * | 11/2007 | Lim et al. | ...................... | 455/442 |
| 7,583,977 B2 * | 9/2009 | Willenegger et al. | ......... | 455/522 |
| 7,586,874 B2 * | 9/2009 | Rudolf et al. | .................. | 370/330 |
| 7,593,746 B2 * | 9/2009 | Willenegger et al. | ......... | 455/522 |
| 7,668,138 B2 * | 2/2010 | Abedi | .......................... | 370/331 |
| 7,869,399 B2 * | 1/2011 | Terry | ............................ | 370/329 |
| 7,894,774 B2 * | 2/2011 | Darwood | ..................... | 455/63.1 |
| 7,949,299 B2 * | 5/2011 | Rudolf et al. | ................ | 455/3.06 |

(Continued)

FOREIGN PATENT DOCUMENTS

KR    10-2008-0084087    9/2008

(Continued)

OTHER PUBLICATIONS

European Search Report dated Apr. 22, 2009; Application No. 08167168.7-2412.

(Continued)

*Primary Examiner* — Marceau Milord
(74) *Attorney, Agent, or Firm* — Murphy & King, P.C.

(57) ABSTRACT

An inter-cell interference mitigation signaling method for controlling the use of a plurality of inter-cell interference mitigation methods during wireless communications between a first wireless communications apparatus and a second wireless communications apparatus, the method comprising
  performing a system configuration procedure to select one or more of the inter-cell interference mitigation methods for use during the wireless communications between the first wireless communications apparatus and the second wireless communications apparatus;
  performing an initiation procedure to start the use of the one or more selected inter-cell interference mitigation methods in response to the meeting of the predetermined initiation criteria; and
  performing a termination procedure to end the use of the one or more selected inter-cell interference mitigation methods in response to the meeting of predetermined termination criteria.

18 Claims, 11 Drawing Sheets

U.S. PATENT DOCUMENTS

| | | | |
|---|---|---|---|
| 8,130,720 B2* | 3/2012 | Zhang et al. | 370/331 |
| 8,160,629 B2* | 4/2012 | Mate et al. | 370/331 |
| 2002/0154713 A1 | 10/2002 | Sparrman et al. | |
| 2008/0227422 A1 | 9/2008 | Hwang et al. | |
| 2009/0227261 A1* | 9/2009 | Tiirola et al. | 455/450 |
| 2010/0061496 A1* | 3/2010 | Black et al. | 375/346 |
| 2010/0290407 A1* | 11/2010 | Uemura | 370/329 |

FOREIGN PATENT DOCUMENTS

| | | |
|---|---|---|
| WO | 2005032185 A1 | 4/2005 |
| WO | 2008072055 A2 | 6/2008 |
| WO | 2008095543 A1 | 8/2008 |

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Band and Corrigendum 1 IEEE Std 802.16e-2005 and IEEE Std 802.16-2004/Cor1-2005 Feb. 28, 2006.

Draft Amendment to IEEE Standard for Local and metropolitan area networks Part 16: Air Interface for Broadband Wireless Access Systems Advanced Air Interface P802.16m/D1 Jul. 2009.

IEEE C802.16m-07/218r7 IEEE 802.16 Broadband Wireless Access Working Group <http://ieee802.org/16> A New Approach for Intercell Interference Radomization based on Cell/Sector-specific Interleaver Pattern dated Jul. 8, 2008.

Mobile WiMax—Part I: A Technical Overview and Performance Evaluation Prepard on Behalf of the WiMAX Forum Feb. 21, 2006.

Korean Intellectual Property Office Action dated Mar. 23, 2012 received in Patent Application No. 10-2011-146703.

* cited by examiner

The effect of inter-cell interference mitigation on handover

| A | Non-handover area |
| B | Interference mitigation area |
| C | Hard/soft handover area |

INTER-CELL INTERFERENCE MITIGATION SIGNALLING METHODS AND APPARATUS

The invention relates to signalling methods and apparatus for use in inter-cell interference mitigation.

BACKGROUND

Handover, especially hard handover, may interrupt a user's active communication for a specific time duration known as an interruption time, at the rate of tens and hundreds of ms for intra- and inter-frequency handover (HO), respectively. For some time-sensitive services, the interruption time could deteriorate the service level. Further, HO may cause user data to be lost. For these reasons, the target and serving base stations (BS) should buffer user data and on some occasions coordinate the user data transmission to avoid duplication. More seriously, during HO, the mobile station (MS) may drop off due to a lack of radio resources in the target BS or failure of network re-entry to the target BS, etc. From this perspective, HO should be avoided to some extent, whilst keeping other system performance parameters at reasonable levels.

Inter-cell interference is well known to cause degradation in the signal quality of the MS, especially in the cell edge area. Normally, the HO trigger metric is a Receive Signal Strength Indicator (RSSI) or a Carrier-to-Interference-and-Noise Ratio (CINR). HO usually takes place in the cell edge area, where the majority of interference is caused by neighbouring cells. Therefore, mitigating inter-cell interference may lead to potentially delaying HO and/or decreasing HO frequency.

Inter-cell interference avoidance mitigation (ICIM) can be classified as follows:
Interference avoidance/reduction at the transmitter(s), for example Fractional Frequency Reuse (FFR) and interference randomisation.
Interference cancellation/reduction at the receiver(s).

FIG. 1 is a schematic diagram showing a wireless network including seven base stations BS0 to BS6. Around BS0 there are shown three zones A, B and C. Zone A is a non-handover area in which a mobile station located in the zone is not to be handed over to any of the other base stations. Zone B is an interference mitigation area in which inter-cell interference mitigation methods are to be performed. Zone C is a hard/soft handover area in which a mobile station is to be handed over to one of the other base stations BS1 to BS6.

As demonstrated in FIG. 1, without ICIM, the HO area may include areas B and C. By adopting ICIM techniques, the HO area may decrease to area C only, in which case HO frequency would be reduced, thus leading to an enhanced cell edge user performance.

As an amendment system for the IEEE802.16e system, the IEEE802.16m system is required to enhance cell-edge user performance, thereby improving system performance. To introduce ICIM, the 16m system should adopt new physical layer mechanisms and manage this scheme through PHY/MAC layer signalling/messages.

SUMMARY

According to a first aspect, there is provided an inter-cell interference mitigation signalling method for controlling the use of a plurality of inter-cell interference mitigation methods during wireless communications between a first wireless communications apparatus and a second wireless communications apparatus, the method comprising
performing a system configuration procedure to select one or more of the inter-cell interference mitigation methods for use during the wireless communications between the first wireless communications apparatus and the second wireless communications apparatus;
performing an initiation procedure to start the use of the one or more selected inter-cell interference mitigation methods in response to the meeting of the predetermined initiation criteria; and
performing a termination procedure to end the use of the one or more selected inter-cell interference mitigation methods in response to the meeting of predetermined termination criteria.

An inter-cell interference mitigation (ICIM) method may comprise any method by which interference is avoided or reduced at the transmitter, cancelled or reduced at the receiver, or any other such method. For example, ICIM methods may include FFR (Fractional Frequency Re-use), interference randomisation according to the IEEE802.16m contribution C80216m-07_218r7-1 or PUSC (Partial Usage of Subchannels) in IEEE802.16e, where each base station/sector uses an individual subcarrier permutation to reduce the collision probability in under-loaded systems.

The term "wireless communications apparatus" may relate to any apparatus capable of undertaking wireless communications and, in particular, may relate to a base station or a mobile station. The wireless communications apparatuses may form part of a network, for example an IEEE802.16 network. A mobile station may relate to user equipment, for example a mobile telephone, personal digital assistant, laptop or PC. However, it is to be understood that the invention is not limited to such details.

Performing the system configuration procedure may comprise performing a capability negotiation procedure, during which the first and second wireless communications apparatuses communicate to specify which of the plurality of inter-cell interference mitigation methods each apparatus supports, wherein the selection of the one or more inter-cell interference mitigation methods is confined to a subset of the inter-cell interference mitigation methods supported by both the first and second wireless communications apparatuses.

Performing the system configuration procedure may comprise the first wireless communications apparatus transmitting a broadcast message to the second wireless communications apparatus, the broadcast message identifying one or more available inter-cell interference mitigation methods for use during the wireless communications.

The broadcast message may further identify the predetermined initiation criteria, the predetermined initiation criteria specifying at least one parameter to be measured by the second wireless communications apparatus and further specifying a respective trigger threshold value associated with the or each parameter, the or each parameter being further associated with a respective selected inter-cell interference mitigation method, wherein the second wireless communications apparatus is to request the start of the use of a said selected inter-cell interference mitigation method in response to the measured value of the associated parameter rising above or falling below the associated trigger threshold value.

The parameter to be measured may be an interference-related parameter, for example a preamble SINR or a data region SINR. In this case, the method may comprise the second wireless communications apparatus transmitting an identifier or other related measurement(s) of a third wireless communications apparatus which is causing interference in the second wireless communications apparatus. The identifier or other related measurement(s) may be transmitted in a request message along with the request to start the use of the selected inter-cell interference mitigation method (s).

The predetermined initiation criteria may additionally specify one or more trigger averaging durations associated with one or more respective trigger threshold values, the or each trigger averaging duration specifying the time duration over which the second wireless communications apparatus is to average the measured value before applying the threshold, wherein the second communications apparatus is to request the start of the use of the said selected inter-cell interference mitigation method in response to the averaged measured value of the associated parameter rising above or falling below, as appropriate, the associated trigger threshold value.

Performing the initiation procedure may comprise the second wireless communications apparatus transmitting a request message to the first wireless communications apparatus in response to the predetermined initiation criteria being met, and the first wireless communications apparatus transmitting a response message to the second wireless communications apparatus, in response to the receipt of the request message, to indicate whether or not the request is granted.

The method may further comprise performing a process stage after the initiation procedure and before the termination procedure, during which the second wireless communications apparatus transmits the inter-cell interference mitigation method reports to the first wireless communications apparatus as part of the one or more selected inter-cell interference mitigation methods.

Performing the process stage may comprise, in the case that one or more of the selected inter-cell interference mitigation methods requires the second wireless communications apparatus to transmit inter-cell interference mitigation method reports to the first wireless communications apparatus, the first wireless communications apparatus allocating bandwidth to the second wireless communications apparatus for transmitting the reports.

Allocating bandwidth may comprise one or both of the first and second wireless communications apparatuses identifying a predefined shared channel for transmitting the inter-cell interference mitigation method reports, the predefined shared channel being configured for use by the second wireless communications apparatuses and other such wireless communications apparatuses.

Allocating bandwidth may comprise the first wireless communications apparatus transmitting a bandwidth allocation message to the second wireless communications apparatus, the bandwidth allocation message identifying bandwidth for use specifically by the second wireless communications apparatus.

Transmitting the bandwidth allocation message may comprise transmitting the bandwidth allocation message periodically.

Transmitting the bandwidth allocation message may comprise transmitting a single instance of the bandwidth allocation message, and transmitting information specifying a start time and period of the bandwidth allocation.

The termination procedure may comprise the second wireless communications apparatus transmitting a cancellation request message to the first wireless communications apparatus in response to the predetermined termination criteria being met.

Transmitting the cancellation request message may comprise transmitting a stand-alone cancellation request message.

Transmitting the cancellation request message may comprise transmitting the cancellation request message as part of one or more inter-cell interference mitigation method reports.

Transmitting the cancellation request message may comprise transmitting one or more blank inter-cell interference mitigation method reports.

By "blank" it may be meant that the inter-cell interference mitigation method report contains no inter-cell interference mitigation method related data. For example, the report may be a null report or may contain all zeroes as data.

The predetermined termination criteria may comprise the failure by the second wireless communications apparatus to meet the predetermined initiation criteria.

The termination procedure may comprise the first wireless communications apparatus transmitting a cancellation response message to the second wireless communications apparatus in response to the predetermined termination criteria being met.

Transmitting the cancellation response message may comprise transmitting a stand-alone cancellation response message.

Transmitting the cancellation response message may comprise de-allocating bandwidth for the second wireless communications apparatus to transmit inter-cell interference mitigation method reports.

The predetermined termination criteria may comprise the detection by the first wireless communications system of a lack of communications resources.

The method of any preceding claim wherein the predetermined termination criteria comprise one or more of a deterioration in channel condition, the triggering of a handover process, and the termination of the wireless communications between the first and second wireless communications apparatuses.

Unless otherwise stated, features of the method of the first aspect may be performed by one or both of the first and second wireless communications apparatuses. However, there are also provided in second and third aspects methods to be performed respectively by the first and second apparatuses.

According to the second aspect, there is provided an inter-cell interference mitigation signalling method for use in a first wireless communications apparatus for controlling the use of a plurality of inter-cell interference mitigation methods during wireless communications between the first wireless communications apparatus and a second wireless communications apparatus, the method comprising the first wireless communications apparatus:

performing a system configuration procedure to select one or more of the inter-cell interference mitigation methods for use during the wireless communications between the first wireless communications apparatus and the second wireless communications apparatus;

performing an initiation procedure to start the use of the one or more selected inter-cell interference mitigation methods in response to the meeting of the predetermined initiation criteria; and performing a termination procedure to end the use of the one or more selected inter-cell interference mitigation methods in response to the meeting of predetermined termination criteria.

Performing the system configuration procedure may comprise performing a capability negotiation procedure, during which the first wireless communications apparatus transmits signalling to the second wireless communications apparatus to specify which of the plurality of inter-cell interference mitigation methods it supports. The first wireless communications apparatus may receive signalling from the second wireless communications apparatus to specify which of the plurality of inter-cell interference mitigation methods the second wireless communications apparatus supports. The selection of the one or more inter-cell interference mitigation methods may be performed by the first wireless communications apparatus, and may be confined to a subset of the inter-cell interference mitigation methods supported by both the first and second wireless communications apparatuses.

Performing the system configuration procedure may comprise the first wireless communications apparatus transmitting a broadcast message to the second wireless communications apparatus, the broadcast message identifying one or more available inter-cell interference mitigation methods for use during the wireless communications. The broadcast message may further identify the predetermined initiation criteria, as described above with respect to the first aspect.

Performing the initiation procedure may comprise the first wireless communications apparatus receiving a request message from the second wireless communications apparatus, and the first wireless communications apparatus transmitting a response message to the second wireless communications apparatus, in response to the receipt of the request message, to indicate whether or not the request is granted.

The method may further comprise performing a process stage after the initiation procedure and before the termination procedure, during which the first wireless communications apparatus receives the inter-cell interference mitigation method reports from the second wireless communications apparatus as part of the one or more selected inter-cell interference mitigation methods.

Performing the process stage may comprise, in the case that one or more of the selected inter-cell interference mitigation methods requires the second wireless communications apparatus to transmit inter-cell interference mitigation method reports to the first wireless communications apparatus, the first wireless communications apparatus allocating bandwidth to the second wireless communications apparatus for transmitting the reports. Allocating bandwidth may comprise the features described above with respect to the first aspect.

The termination procedure may comprise the first wireless communications apparatus receiving a cancellation request message from the second wireless communications apparatus.

The termination procedure may comprise the first wireless communications apparatus transmitting a cancellation response message to the second wireless communications apparatus in response to the predetermined termination criteria being met. Transmitting the cancellation response message may comprise the features described above with respect to the first aspect.

According to the third aspect, there is provided an inter-cell interference mitigation signalling method for use in a second wireless communications apparatus for controlling the use of a plurality of inter-cell interference mitigation methods during wireless communications between a first wireless communications apparatus and the second wireless communications apparatus, the method comprising the second wireless communications apparatus:

performing a system configuration procedure to select one or more of the inter-cell interference mitigation methods for use during the wireless communications between the first wireless communications apparatus and the second wireless communications apparatus;

performing an initiation procedure to start the use of the one or more selected inter-cell interference mitigation methods in response to the meeting of the predetermined initiation criteria; and performing a termination procedure to end the use of the one or more selected inter-cell interference mitigation methods in response to the meeting of predetermined termination criteria.

Performing the system configuration procedure may comprise performing a capability negotiation procedure, during which the second wireless communications apparatus transmits signalling to the first wireless communications apparatus to specify which of the plurality of inter-cell interference mitigation methods it supports. The second wireless communications apparatus may receive signalling from the first wireless communications apparatus to specify which of the plurality of inter-cell interference mitigation methods the first wireless communications apparatus supports. The selection of the one or more inter-cell interference mitigation methods may be performed by the second wireless communications apparatus, and may be confined to a subset of the inter-cell interference mitigation methods supported by both the first and second wireless communications apparatuses.

Performing the system configuration procedure may comprise the second wireless communications apparatus receiving a broadcast message from the first wireless communications apparatus, the broadcast message identifying one or more available inter-cell interference mitigation methods for use during the wireless communications. The broadcast message may further identify the predetermined initiation criteria, as described above.

The method may comprise the second wireless communications apparatus measuring the at least one parameter and comparing the measured parameter to the respective trigger threshold value. The method may further comprise the second wireless communications apparatus requesting the start of the use of respective selected inter-cell interference mitigation method in response to the measured value of the associated parameter rising above or falling below the associated trigger threshold value.

In the case that the parameter to be measured is an interference-related parameter, for example a preamble SINR or a data region SINR, the method may comprise the second wireless communications apparatus transmitting an identifier or other related measurement(s) of a third wireless communications apparatus which is causing interference in the second wireless communications apparatus.

The method may comprise the second wireless communications apparatus averaging the measured parameter over a time duration corresponding to the trigger averaging duration, before applying the threshold. The second communications apparatus may request the start of the use of the said selected inter-cell interference mitigation method in response to the averaged measured value of the associated parameter rising above or falling below, as appropriate, the associated trigger threshold value.

Performing the initiation procedure may comprise the second wireless communications apparatus transmitting a request message to the first wireless communications apparatus in response to the predetermined initiation criteria being met. The initiation procedure may also comprise the second wireless communications apparatus receiving a response message from the first wireless communications apparatus to indicate whether or not the request is granted.

The method may further comprise performing a process stage after the initiation procedure and before the termination procedure, during which the second wireless communications apparatus transmits the inter-cell interference mitigation method reports to the first wireless communications apparatus as part of the one or more selected inter-cell interference mitigation methods.

Performing the process stage may comprise, in the case that one or more of the selected inter-cell interference mitigation methods requires the second wireless communications apparatus to transmit inter-cell interference mitigation method reports to the first wireless communications apparatus, the second wireless communications apparatus receiving a bandwidth allocation from the first wireless communications apparatus for transmitting the reports. Bandwidth may be allocated as described above with respect to the first aspect.

The termination procedure may comprise the second wireless communications apparatus transmitting a cancellation request message to the first wireless communications apparatus in response to the predetermined termination criteria being met. Transmitting the cancellation request message may comprise the features described above with respect to the first aspect.

The second wireless communications apparatus may meet the predetermined termination criteria by failing to meet the predetermined initiation criteria.

The termination procedure may comprise the second wireless communications apparatus receiving a cancellation response message from the first wireless communications apparatus.

Unless otherwise stated, the method of any of the first to third aspects may include one, some or all of the features of any of the other of the methods of the first to the third aspects.

According to a fourth aspect, there is provided an inter-cell interference mitigation signalling apparatus for controlling the use of a plurality of inter-cell interference mitigation methods during wireless communications between the first wireless communications apparatus and a second wireless communications apparatus, the apparatus comprising
  system configuration circuitry configured to perform a system configuration procedure to select one or more of the inter-cell interference mitigation methods for use during the wireless communications between the first wireless communications apparatus and the second wireless communications apparatus;
  initiation circuitry configured to perform an initiation procedure to start the use of the one or more selected inter-cell interference mitigation methods in response to the meeting of the predetermined initiation criteria; and
  termination circuitry configured to performing a termination procedure to end the use of the one or more selected inter-cell interference mitigation methods in response to the meeting of predetermined termination criteria.

The system configuration circuitry may be configured to perform a capability negotiation procedure, during which the first and second wireless communications apparatuses communicate to specify which of the plurality of inter-cell interference mitigation methods each apparatus supports. The system configuration circuitry may be configured to select the one or more inter-cell interference mitigation methods from a subset of the inter-cell interference mitigation methods supported by both the first and second wireless communications apparatuses.

The system configuration circuitry may be configured, when performing the system configuration procedure, to transmit a broadcast message from the first wireless communications apparatus to the second wireless communications apparatus, the broadcast message identifying one or more available inter-cell interference mitigation methods for use during the wireless communications.

In the case that the broadcast message further identifies the predetermined initiation criteria, and the predetermined initiation criteria specify at least one parameter to be measured by the second wireless communications apparatus and further specifying a respective trigger threshold value associated with the or each parameter, the or each parameter being further associated with a respective selected inter-cell interference mitigation method, the initiation circuitry may be configured to request the start of the use of a said selected inter-cell interference mitigation method in response to the measured value of the associated parameter rising above or falling below the associated trigger threshold value.

In the case that the parameter is an interference-related parameter, for example preamble SINR or data region SINR, the second wireless communications apparatus may be configured to transmit an identifier or other related measurement(s) of a third wireless communications apparatus which is causing interference in the second wireless communications apparatus.

In the case that the predetermined initiation criteria additionally specify one or more trigger averaging durations associated with one or more respective trigger threshold values, the or each trigger averaging duration specifying the time duration over which the second wireless communications apparatus is to average the measured value before applying the threshold, the initiation circuitry may be configured to request the start of the use of the said selected inter-cell interference mitigation method in response to the averaged measured value of the associated parameter rising above or falling below, as appropriate, the associated trigger threshold value.

During the initiation procedure, the initiation circuitry may be configured to transmit a request message from the second wireless communications apparatus to the first wireless communications apparatus in response to the predetermined initiation criteria being met. The initiation circuitry may be configured to transmit a response message from the first wireless communications apparatus to the second wireless communications apparatus, in response to the receipt of the request message, to indicate whether or not the request is granted.

The apparatus may further comprise process circuitry configured to perform a process stage after the initiation procedure and before the termination procedure. During the process stage, the process circuitry may be configured to transmit the inter-cell interference mitigation method reports from the second wireless communications apparatus to the first wireless communications apparatus as part of the one or more selected inter-cell interference mitigation methods.

During the process stage, in the case that one or more of the selected inter-cell interference mitigation methods requires the second wireless communications apparatus to transmit inter-cell interference mitigation method reports to the first wireless communications apparatus, the process circuitry may be configured to allocate bandwidth from the first wireless communications apparatus to the second wireless communications apparatus for transmitting the reports.

The process circuitry may be configured to allocate bandwidth by identifying a predefined shared channel for transmitting the inter-cell interference mitigation method reports, the predefined shared channel being configured for use by the second wireless communications apparatuses and other such wireless communications apparatuses.

The process circuitry may be configured to allocate bandwidth by transmitting a bandwidth allocation message from the first wireless communications apparatus to the second wireless communications apparatus, the bandwidth allocation message identifying bandwidth for use specifically by the second wireless communications apparatus.

The process circuitry may be configured to transmit the bandwidth allocation message periodically.

The process circuitry may be configured to transmit a single instance of the bandwidth allocation message, and to transmit information specifying a start time and period of the bandwidth allocation.

During the termination procedure, the termination circuitry may be configured to transmit a cancellation request message from the second wireless communications apparatus to the first wireless communications apparatus in response to the predetermined termination criteria being met.

The termination circuitry may be configured to transmit a stand-alone cancellation request message.

The termination circuitry may be configured to transmit the cancellation request message as part of one or more inter-cell interference mitigation method reports.

The termination circuitry may be configured to transmit one or more blank inter-cell interference mitigation method reports.

During the termination procedure, the termination circuitry may be configured to transmit a cancellation response message from the first wireless communications apparatus to the second wireless communications apparatus in response to the predetermined termination criteria being met.

The termination circuitry may be configured to transmit a stand-alone cancellation response message.

The termination circuitry may be configured to de-allocate bandwidth for the second wireless communications apparatus to transmit inter-cell interference mitigation method reports.

The termination circuitry may be configured to detect a lack of communications resources at the first wireless communications system.

Unless otherwise stated, features of the apparatus of the fourth aspect may form part of one or both of the first and second wireless communications apparatuses. However, there are also provided in fifth and sixth aspects apparatuses to form part of the first and second apparatuses respectively.

According to a fifth aspect, there is provided the inter-cell interference mitigation signalling apparatus of the fourth aspect configured to form part of the first wireless communications apparatus. The circuitry of the apparatus may be configured to perform any of the features of the method of the second aspect.

According to a sixth aspect, there is provided the inter-cell interference mitigation signalling apparatus of the fourth aspect configured to form part of the second wireless communications apparatus. The circuitry of the apparatus may be configured to perform any of the features of the method of the third aspect.

Unless otherwise stated, the apparatus of any of the fourth to sixth aspects may include one, some or all of the features of any of the other of the apparatuses of the fourth to sixth aspects.

According to a seventh aspect, there is provided a computer program which, when run on a computer, causes the computer to perform the method as claimed in any of the first to third aspects, or to become the apparatus as claimed in any of the fourth to sixth aspects, wherein the computer program may be carried by a carrier medium, which may be a recording medium or a transmission medium.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

The invention may provide a MAC layer workflow and messages for ICIM (inter-cell interference mitigation) management.

Figure 1:
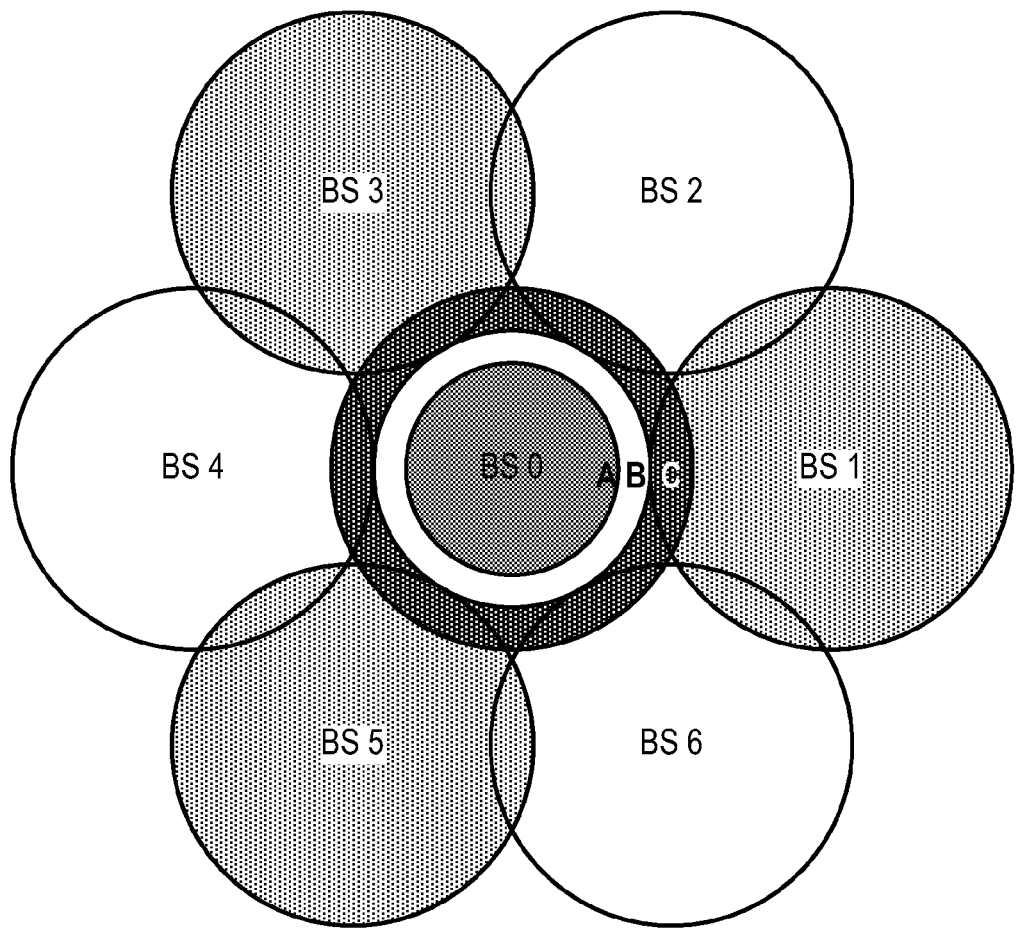
FIG. 1 illustrates the effect of inter-cell interference mitigation on handover.
Figure 2:
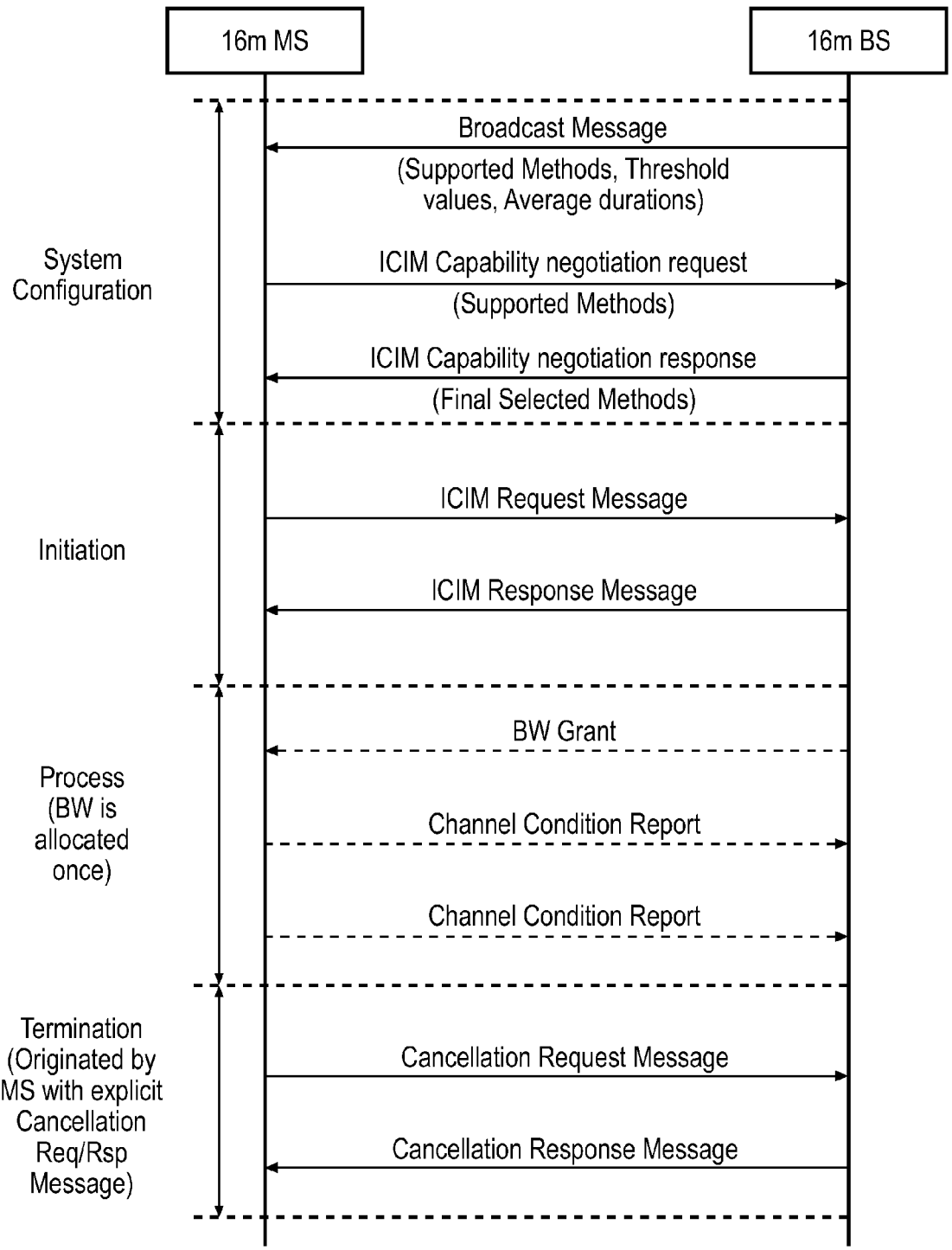
FIG. 2 shows an example of inter-cell interference mitigation signalling.

To adopt DL ICIM, there is provided an ICIM procedure with four phases: system configuration, initiation, process, and termination. FIG. 2 shows one example of an ICIM procedure.

FIG. 2 is a diagram illustrating signalling which may take place in the example of an ICIM procedure between a 16m base station and a 16m mobile station. The signalling is divided into the four phases: a system configuration procedure, an initiation procedure, a process stage and a termination procedure. In the system configuration procedure, the 16m base station transmits a broadcast message to the 16m mobile station. The broadcast message identifies one or more supported methods, and thresholds and averaging durations associated with respective methods. The broadcast message may be followed by an ICIM capability negotiation procedure, during which the mobile station transmits an ICIM capability negotiation request to the base station, identifying the methods which the mobile station supports. The base station may then transmit an ICIM capability negotiation response to the mobile station, identifying the final selected methods. In the initiation procedure, the mobile station transmits an ICIM request message to the base station and in response the base station transmits an ICIM response message back to the mobile station. During the process stage, the base station optionally transmits a bandwidth grant message to the mobile station, and the mobile station may transmit one or more ICIM reports or channel condition reports to the base station. During the termination procedure, the mobile station transmits a cancellation request message to the base station and the base station returns a cancellation response message to the mobile station. In FIG. 2, the signalling of the optional process stage is indicated with dotted lines. In the specific example shown in FIG. 2, bandwidth is allocated only once from the base station to the mobile station and termination is requested by the mobile station with an explicit cancellation request message.

The system configuration procedure will now be described.

In system broadcast messages, the ICIM methods supported by the BS and corresponding trigger threshold values are provided to all the MSs in the cell. Depending on the specific schemes, different types of threshold value may be supplied (for example, Preamble SINR, Data region SINR and so on). Additionally, the trigger averaging duration corresponding to each threshold value may also be supplied. The ICIM methods broadcast might be changed over time depending on the system decision. As an example, in the case of ICIM using FFR, a data region SINR threshold value, the trigger averaging duration for data region SINR threshold, as well as the specific ICIM method "FFR" itself (which could be in the form of a predefined coding or bitmap) can be supplied. In the predefined coding example, if there are three available ICIM methods a, b and c, in the method field of the broadcast message, "00" may represent method a, "01" may represent method b, and "10" may represent method c. In the bitmap example, one bit may represent one method. For example, "001" may represent method a, "010" may represent method b, "100" may represent method c, and "110" may represent both method b and c.

When a new MS accesses the BS, during the network entry/access phase, the BS and MS may negotiate the capability of ICIM. The MS may inform the BS of its supported ICIM methods in the ICIM capability negotiation request message, and the BS may respond with the final selected method or multiple methods in the ICIM capability negotiation response message.

The initiation procedure will now be described.

If an MS supports ICIM, when predetermined criteria, for example a trigger condition, are met, the MS should send an ICIM request message to acquire ICIM. The interfering BS identifier or other related measurement(s) may be supplied simultaneously. In the example case of ICIM using FFR, the ICIM request message can be sent when the data region SINR value falls below the threshold value.

On reception of the ICIM request message, the serving BS may coordinate with neighbour BSs listed in the ICIM request message and, based on certain criteria, for instance, radio resource availability, load balancing, etc., respond to the MS. The response can occur as an MAC message or PHY signal. If the system supports the scheme of the adopted ICIM method being changed while the ICIM procedure is active, the BS may respond to the ICIM request message with the adopted methods in the ICIM response message. If the system does not support such a scheme, the BS may not supply the adopted ICIM method in the ICIM response message.

Figure 3:
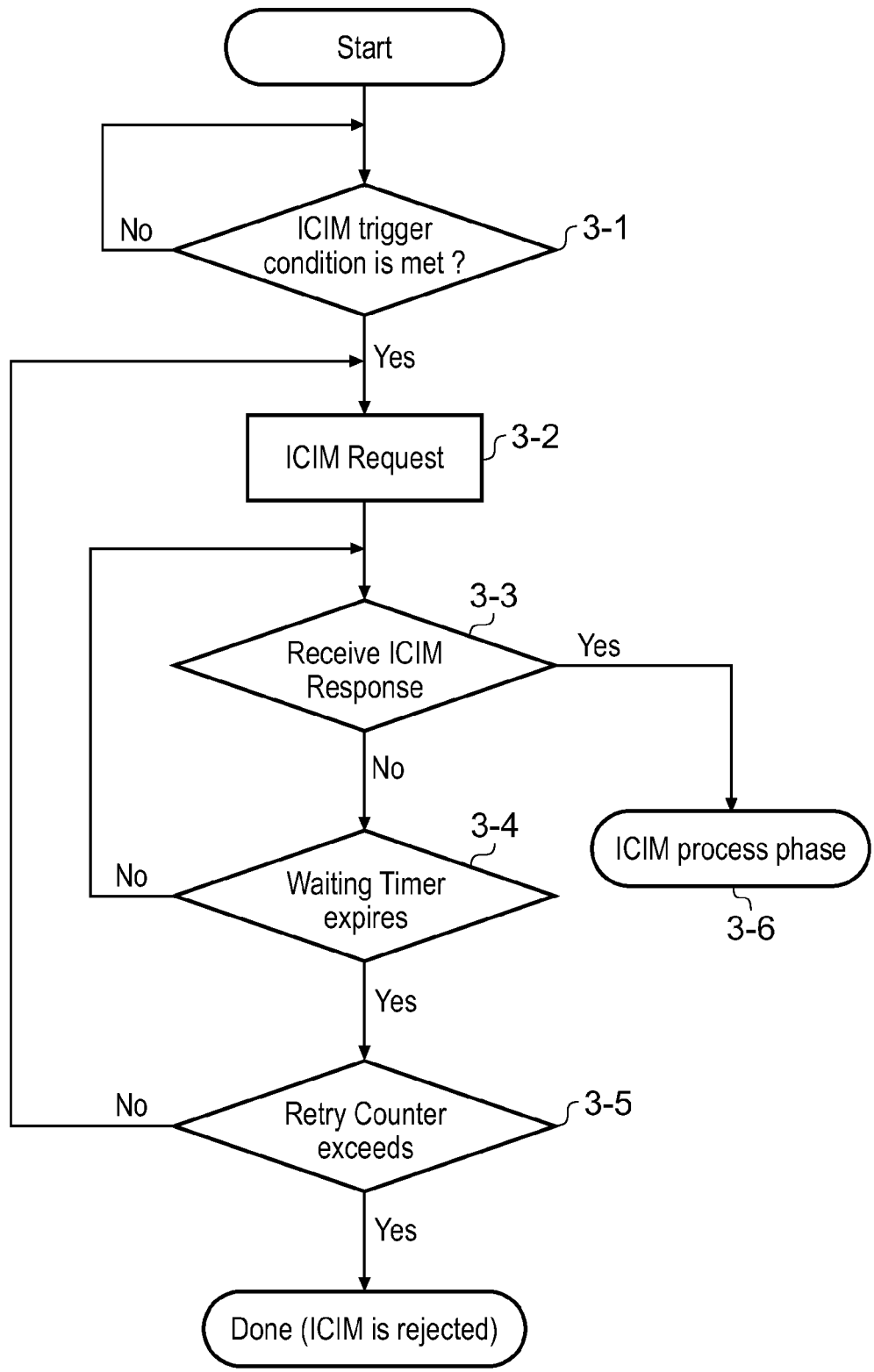
FIG. 3 is a flowchart representing an example of an initiation procedure.

FIG. 3 is a flowchart representing the actions of the mobile station during the initiation procedure. Once the procedure is started, the mobile station in step 3-1 determines whether or not the ICIM trigger condition is met. If it is not met, the mobile station returns step 3-1. If the condition is met, the mobile station proceeds to step 3-2. In step 3-2, the mobile station transmits an ICIM request message to the base station. In step 3-3, the mobile station determines whether or not an ICIM response message has been received from the base station. If not, the mobile station proceeds to step 3-4. If the ICIM response message has been received, the mobile station proceeds to step 3-6, in which the ICIM process stage begins. In step 3-4, the mobile station determines whether or not its waiting timer has expired. If not, the mobile station returns to step 3-3. If the timer has expired, the mobile station proceeds to step 3-5. In step 3-5 the mobile station determines whether or not its retry counter has been exceeded. If not, the mobile station returns to step 3-2. If the counter has been exceeded, the ICIM procedure is terminated.

The process stage will now be described.

If the serving BS agrees to perform ICIM and the adopted ICIM method(s) require ICIM related feedback from the MS, the BS may allocate the BW for the MS to transmit the optional ICIM reports. In the example case of ICIM using FFR, ICIM reporting is not required.

Regarding the BW allocation for the MS ICIM report, there may be two types of BW allocation manner: shared and unique.

Shared BW allocation will now be described.

If the serving BS has allocated a predefined fixed size channel for the MS ICIM report or some other feedback information, the MS can utilise this channel for the ICIM report under the configuration of the serving BS. This predefined channel can be shared with other MSs under the instruction of the serving BS. Based on the serving BS configuration for this predefined channel, the MS can know whether or not there is BW allocated for it. The serving BS may use a MAP-like scheme. For example, in a MAP-like broadcast message, the serving BS may point to the BW occupier and duration. In the case that the predefined channel is shared with other management messages and/or user data of the MS itself, the serving BS may not allocate MS BW if the serving BS determines that the predefined channel size is sufficient. In this case, the MS reports the channel condition using this private BW, which is always available, so the BS may explicitly inform the MS of ICIM termination in the case of BS-originated termination, as otherwise the MS would continue to report the channel condition.

Unique BW allocation will now be described.

If the serving BS has not allocated the predefined channel or if it determines to allocate additional BW for the MS ICIM report regardless of predefined channel allocation, the serving BS may allocate specific BW for the ICIM report. The serving BS has two ways to allocate such BW: periodic allocation and fixed allocation.

In periodic allocation, the BS allocates bandwidth by periodically sending BW allocation messages (UL-MAP IE, etc). The MS may detect the BW allocation message to find the allocated BW location, because in this case the BW location could be changed. When ICIM termination is originated by the MS or BS, the serving BS can inform the MS of the termination of the BW allocation by a BW allocation message (BW size is zero) or a cancellation response message/subheader.

In fixed allocation, the BS allocates bandwidth using a BW allocation message which it sends only once. As such BW needs to be allocated to the MS periodically, the serving BS may inform the MS of an allocation starting time and period. The allocation starting time can be contained in the ICIM response message and the period can be contained in the first BW allocation message or the ICIM response message. Then the MS can get the BW at a predefined time in a predefined location (the location is fixed and informed by the first BW allocation message). In this case, when ICIM termination is originated by the MS or BS, the serving BS may inform the MS of the termination of the BW allocation explicitly by a cancellation response message/subheader.

If the MS obtains the BW, it may feed back the ICIM reports continuously and periodically on the specific report channel or predefined UL feedback channel until ICIM is terminated. The ICIM report may, depending on the scheme, be associated with neighbour BSs and for example contain interfering Cell ID, pre-coding vectors with respect to interfering cells, or any other ICIM related signalling.

Meanwhile, the serving BS may perform ICIM, which may involve cooperation with neighbour BSs using backbone message exchange. On the air interface, the serving and possibly the neighbour BSs can perform the ICIM physical layer technique, which may be done under the instruction of backbone network messages for coordination. In the example case of ICIM using FFR, the serving BS may make resource allocations for the MS in a zone with a higher reuse factor in order to reduce the inter-cell interference.

If the system supports the scheme of the adopted ICIM method being changed while the ICIM procedure is active, the BS can transmit the ICIM response message unsolicitedly to inform the new method adopted if it or some other network entities decide to change the ICIM method. If the UL BW for the MS ICIM report needs to be changed, the BS may re-allocate BW for the MS.

The termination procedure will now be described.

ICIM may be terminated if any of the following termination criteria are met.

a) The channel condition is upgraded, and the ICIM trigger condition is no longer met (MS origination);
b) The ICIM cannot be performed continuously due to a lack of radio resource or some other reasons (BS origination);
c) The channel condition is deteriorated further, HO is triggered or the MS is dropped off under an abnormal condition (automatic termination).

In the case of a), the MS can inform the serving BS of termination by transmission of an explicit cancellation request message, which message can reuse the ICIM request message with an action indication or occur as a new defined message/subheader. Another option for cancellation is that the MS can piggyback the cancellation indication in the report message/channel, predefined or specific, if ICIM reports are necessary. This piggyback cancellation indication could be an explicitly defined encoding or take the form of blank ICIM reports (zeros). The latter is considered as an implicit cancellation request. The implicit mode can minimise the overhead. In the example case of ICIM using FFR, the MS can request to terminate ICIM when the data region SINR value rises above the threshold value.

On reception of the cancellation request message/indicate, the serving BS can transmit an explicit cancellation response message, which message can reuse the ICIM response message with an action indication or occur as a new defined message/subheader, or stop the BW allocation for the MS ICIM Report.

Figure 4:
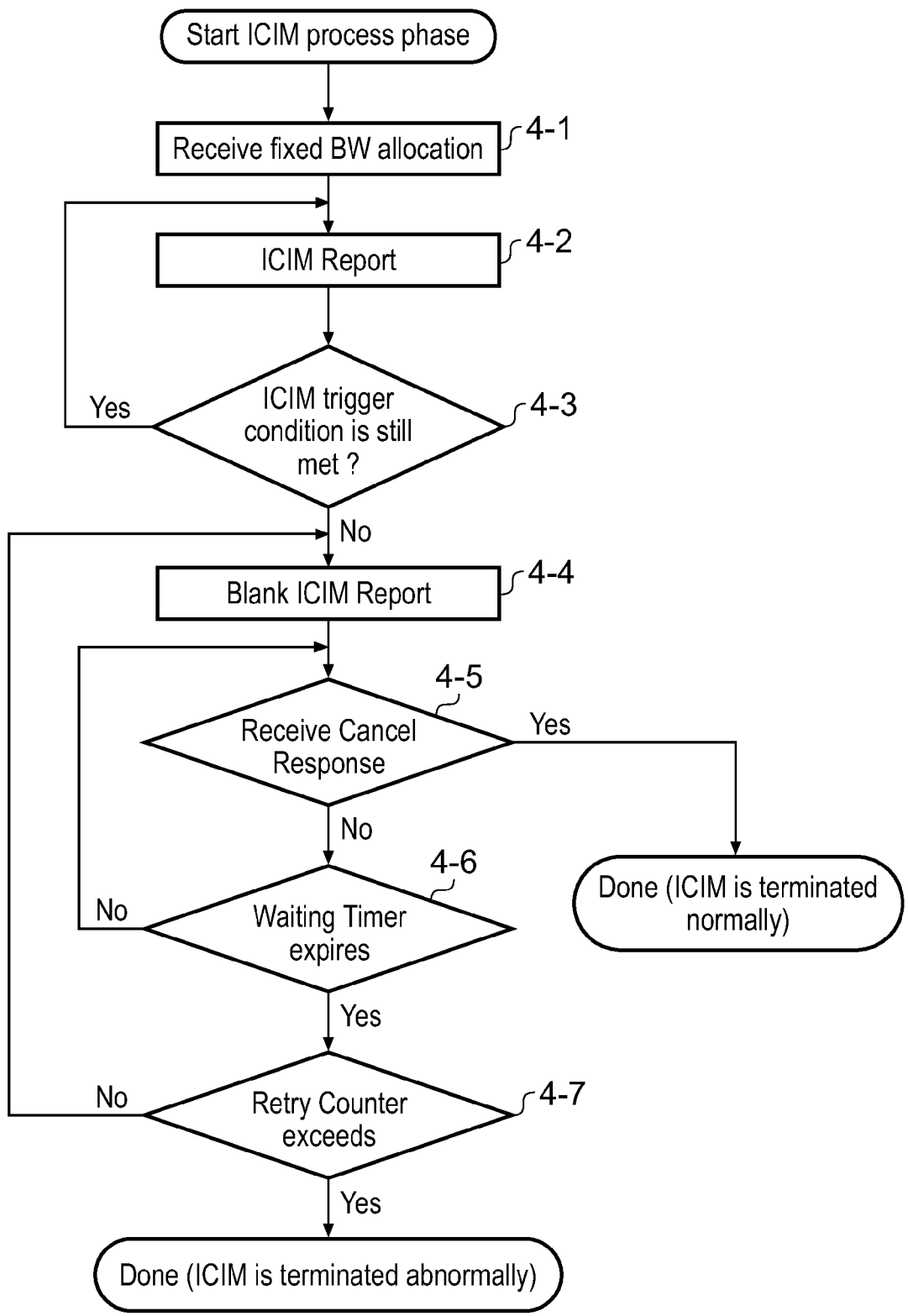
FIG. 4 is a flowchart representing one example of a process stage and a termination procedure.

FIG. 4 is a flowchart representing an example of the actions of the mobile station during the ICIM process stage and termination procedure, in the specific example in which the BW is allocated only once and the termination procedure is initiated by the mobile station implicitly. Following the start of the ICIM process stage, the mobile station receives the fixed BW allocation in step 4-1 and sends the ICIM report in the allocated BW in step 4-2. In step 4-3, the mobile station determines whether or not the ICIM trigger condition is still met. If yes, the mobile station returns to step 4-2. If no, the mobile station sends a blank ICIM report in step 4-4. In step 4-5, the MS determines whether or not it has received a cancellation response message. If yes, the ICIM procedure is terminated normally. If no, the mobile station in step 4-6 needs to determine whether or not the waiting timer has expired. If no, it goes back to step 4-5. If yes, the mobile station in step 4-7 needs to determine whether or not the retry counter has exceeded the maximum number of retries. If no, it goes back to step 4-4. If yes, the ICIM procedure is terminated abnormally.

In the case of b), the serving BS can transmit an explicit cancellation response message, which message can reuse the ICIM response message with an action indication or occur as a newly defined message/subheader, or stop the BW allocation for the MS ICIM report in an implicit manner. In the example case of ICIM using FFR, if the serving BS is unable to find enough resources for the MS in the zone with high reuse factor, the serving BS may originate ICIM termination.

Figure 5:
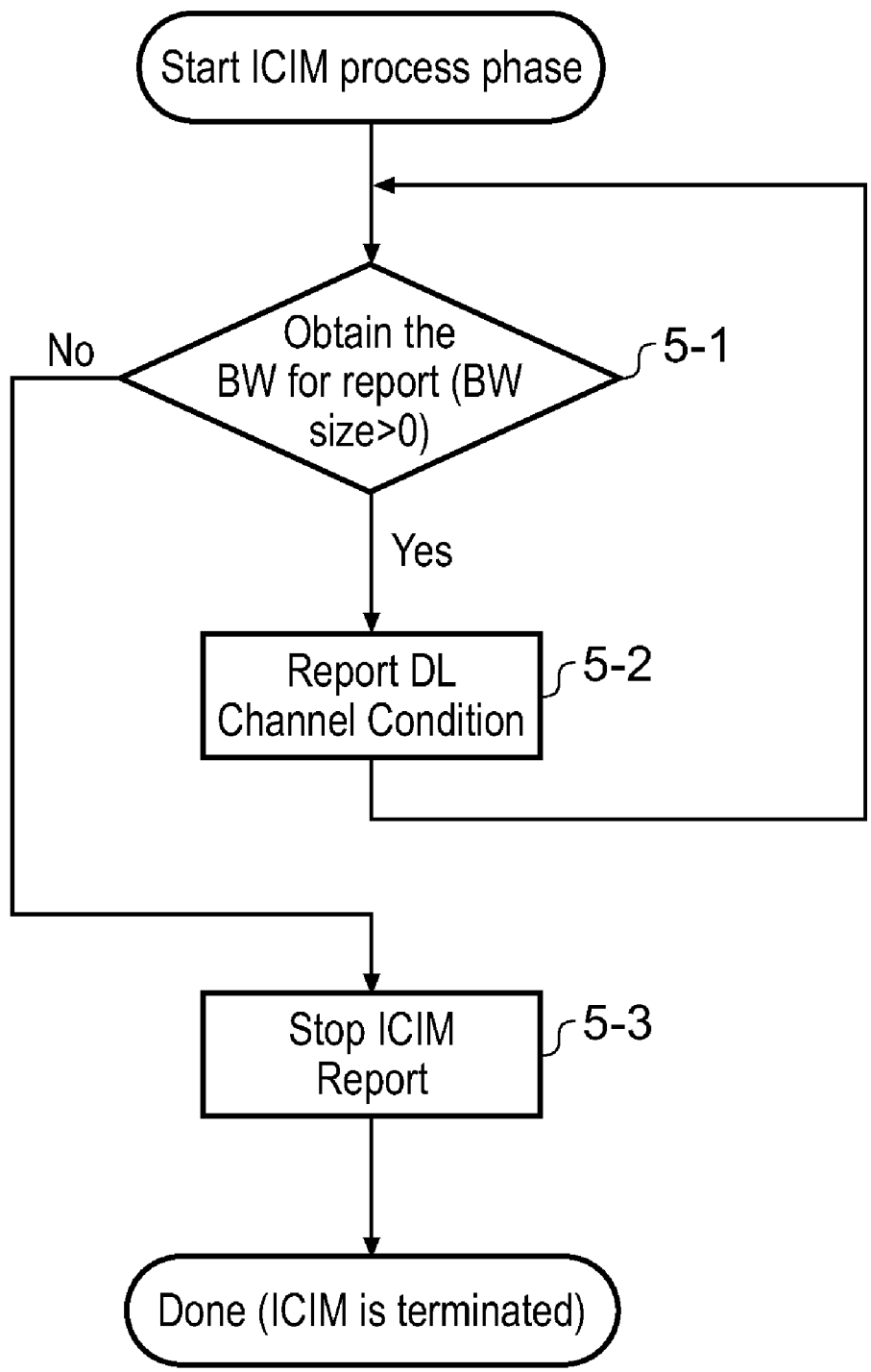
FIG. 5 is a flowchart representing another example of a process stage and a termination procedure.

FIG. 5 is a flowchart representing an example of the actions of the mobile station during the ICIM process stage and termination procedure, in the specific example in which the BW is allocated periodically and the termination procedure is initiated implicitly by the base station. Following the start of the ICIM process stage, in step 5-1 the mobile station determines whether or not it has obtained bandwidth for reporting. The mobile station can determine that it has obtained the bandwidth if the bandwidth size is more than zero. If it has obtained the bandwidth, the mobile station sends the ICIM report in the allocated bandwidth in step 5-2, then goes back to step 5-1. If it has not, it proceeds to step 5-3, in which the mobile station stops sending ICIM reports. The ICIM process is then terminated.

In the case of c), the ICIM is automatically terminated by the relevant messages (e.g. HO messages), or transmission/reception or absence of MS from the air interface. In the former case, upon transmission/reception of HO request from the BS/MS respectively, the BS can stop the BW allocation for the MS ICIM report.

Figure 6:
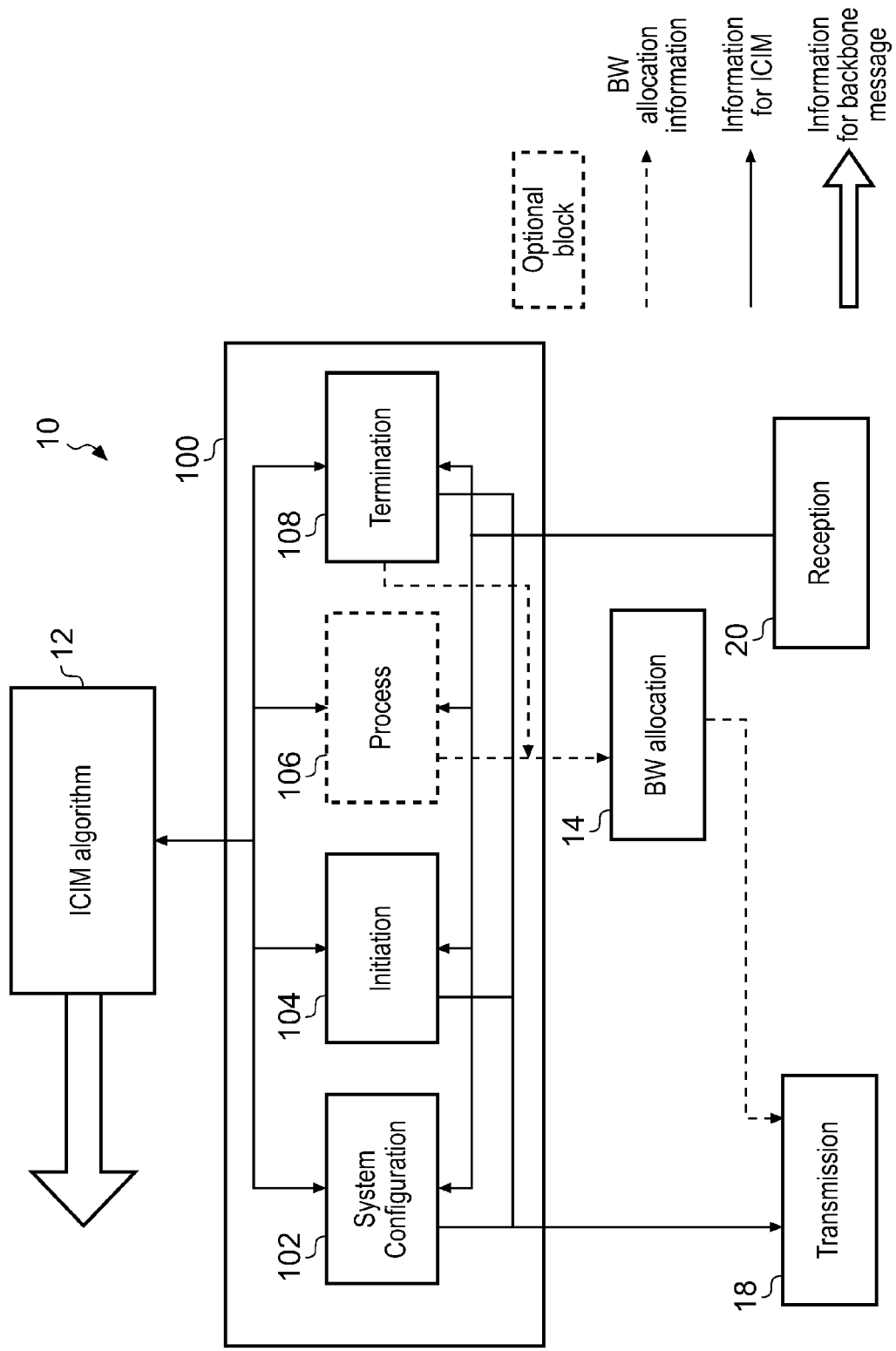
FIG. 6 is a block diagram of an example of a base station.

FIG. 6 is a block diagram showing example of a base station 10. The base station 10 includes ICIM algorithm circuitry 12, bandwidth allocation circuitry 14, transmission circuitry 18, reception circuitry 20 and an ICIM signalling apparatus 100. The ICIM signalling apparatus 100 includes system configuration circuitry 102, initiation circuitry 104, process circuitry 106 and termination circuitry 108. In FIG. 6, the optional process circuitry block 106 is shown with dotted outlines. Dotted arrows indicate bandwidth allocation information. The thinner solid arrows indicate information relating to ICIM. The thicker hollow arrows indicate information relating to backbone messages. The ICIM signalling apparatus 100 is for controlling the use of a plurality of ICIM methods during wireless communications between the base station 10 and a mobile station 50. The system configuration circuitry 102 is configured to perform the system configuration procedure to select one or more of the ICIM methods for use during the wireless communications. The initiation circuitry 104 is configured to perform the initiation procedure to start the use of the one or more selected ICIM methods in response to the meeting of predetermined initiation criteria. The process circuitry 106 is configured to perform the process stage to receive ICIM reports from the mobile station during the wireless communication as part of the one or more selected ICIM methods. The termination circuitry 108 is configured to perform the termination procedure to end the use of the one or more selected ICIM methods in response to the meeting of predetermined termination criteria. The ICIM algorithm circuitry 12 stores one or more algorithms relating to respective ICIM methods supported by the base station 10. The bandwidth allocation circuitry 14 is configured to perform bandwidth allocation or terminate the bandwidth allocation to the MS based on the indication from the process and termination circuitry 106, 108, as described above. The transmission circuitry 18 is transfigured to transmit signalling to the mobile station. The reception circuitry 20 is configured to receive signalling from the mobile station.

Figure 7:
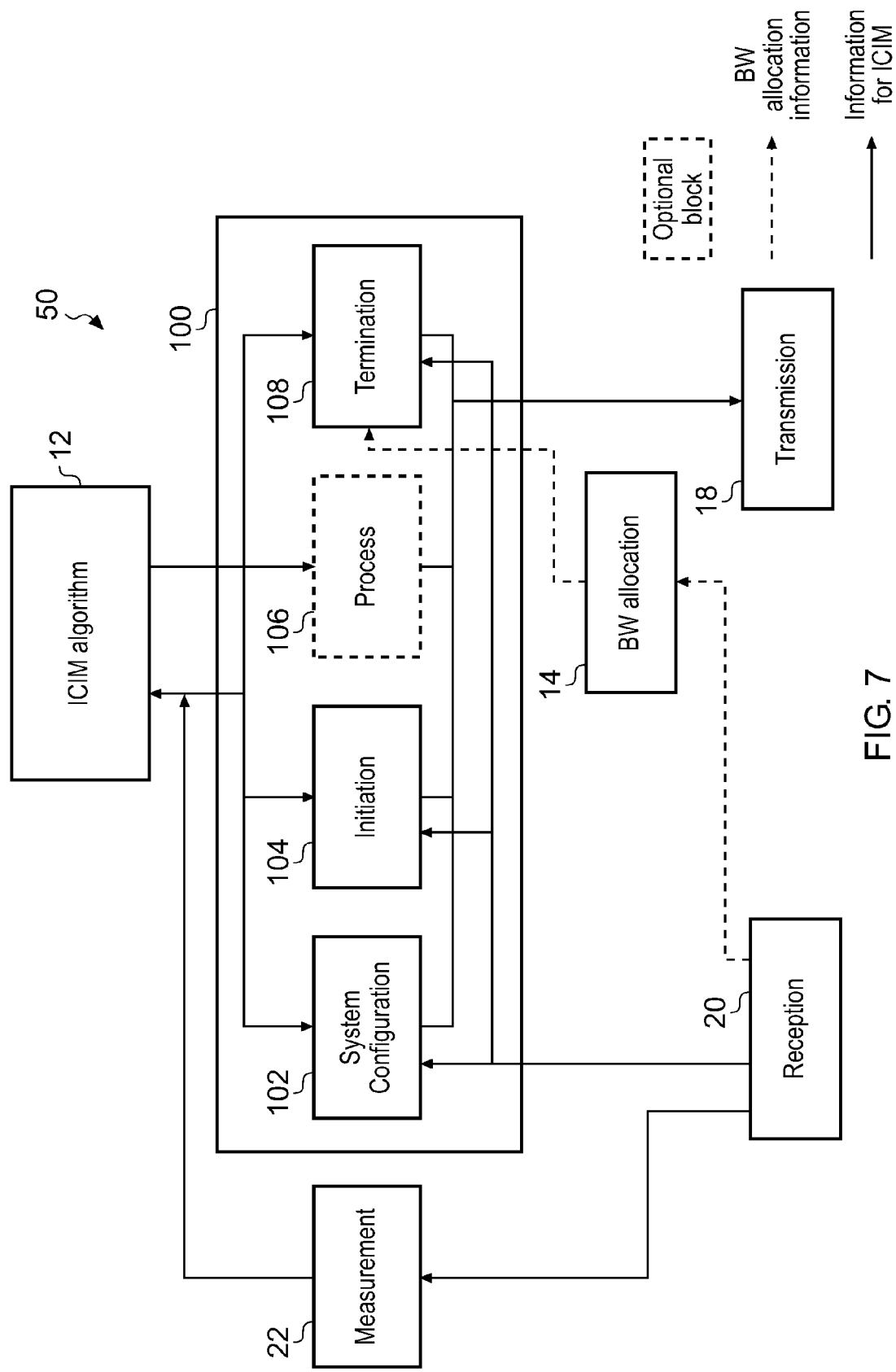
FIG. 7 is a block diagram of an example of a mobile station.

FIG. 7 is a block diagram of a mobile station 50. The mobile station 50 includes ICIM algorithm circuitry 12, bandwidth allocation circuitry 14, transmission circuitry 18, reception circuitry 20, measurement circuitry 22 and an ICIM signalling apparatus 100. The ICIM signalling apparatus 100 includes system configuration circuitry 102, initiation circuitry 104, process circuitry 106 and termination circuitry 108. In FIG. 7, the optional processing circuitry block 106 is indicated with dotted outlines. Dotted arrows indicate signalling relating to bandwidth allocation. Solid arrows indicate signalling related to ICIM. The ICIM algorithm circuitry 12 stores information relating to one or more algorithms supported by the mobile station 50. The bandwidth allocation circuitry 14 is configured to receive a bandwidth allocation from the base station 10 and send the indication to the termination circuitry 108 if necessary, in the manner described above. The transmission circuitry 18 is configured to transmit signalling to the base station 10. The reception circuitry 20 is configured to receive signalling from the base station 10. The measurement circuitry 22 is configured to measure the physical signal received by the reception circuitry 20 and output one or more parameters which are required by the ICIM algorithm 12, as described above. The system configuration circuitry 102 is configured to perform the system configuration procedure to select one or more of the ICIM methods for use during wireless communications between the mobile station 50 and the base station 10. The initiation circuitry 104 is configured to perform the initiation procedure to start the use of the selected ICIM methods in response to the meeting of predetermined initiation criteria. The process circuitry 106 is configured to perform the process stage, after the initiation procedure and before the termination procedure, during which the mobile station 50 transmits ICIM reports to the base station 10 as part of the selected ICIM methods. The termination circuitry 108 is configured to perform the termination procedure to end the use of the selected ICIM methods in response to the meeting of predetermined determination criteria.

Figure 8:
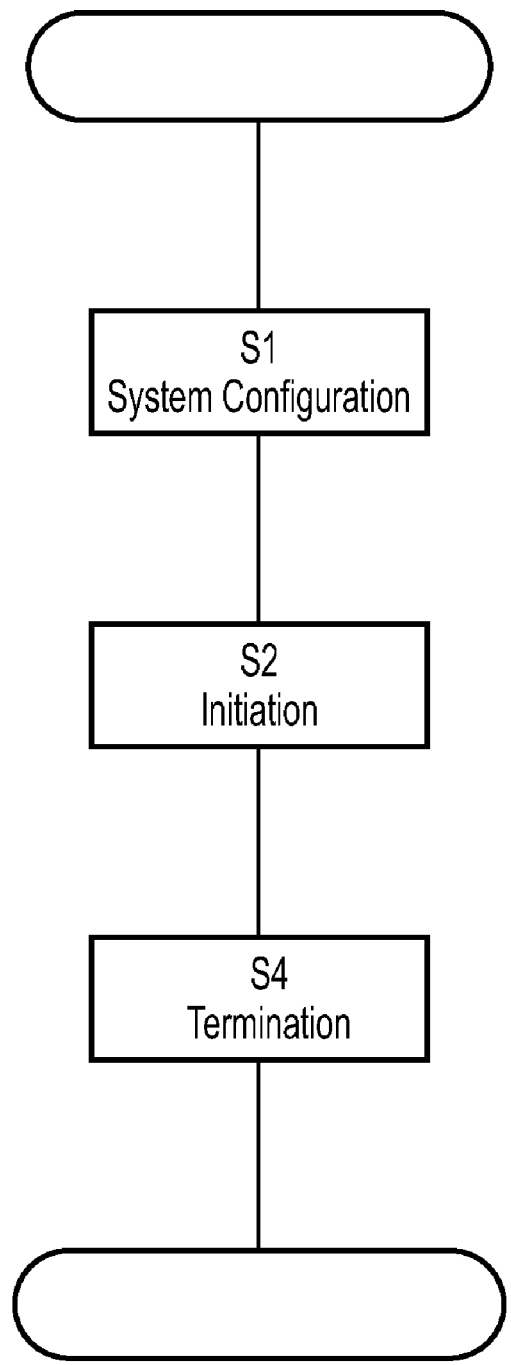
FIG. 8 is a flowchart representing one example of an inter-cell interference mitigation signalling method.

FIG. 8 is a flowchart representing a rudimentary ICIM signalling method. The method includes an operation S1 of performing the system configuration procedure, an operation S2 of performing the initiation procedure and an operation S4 of performing the termination procedure.

Figure 9:
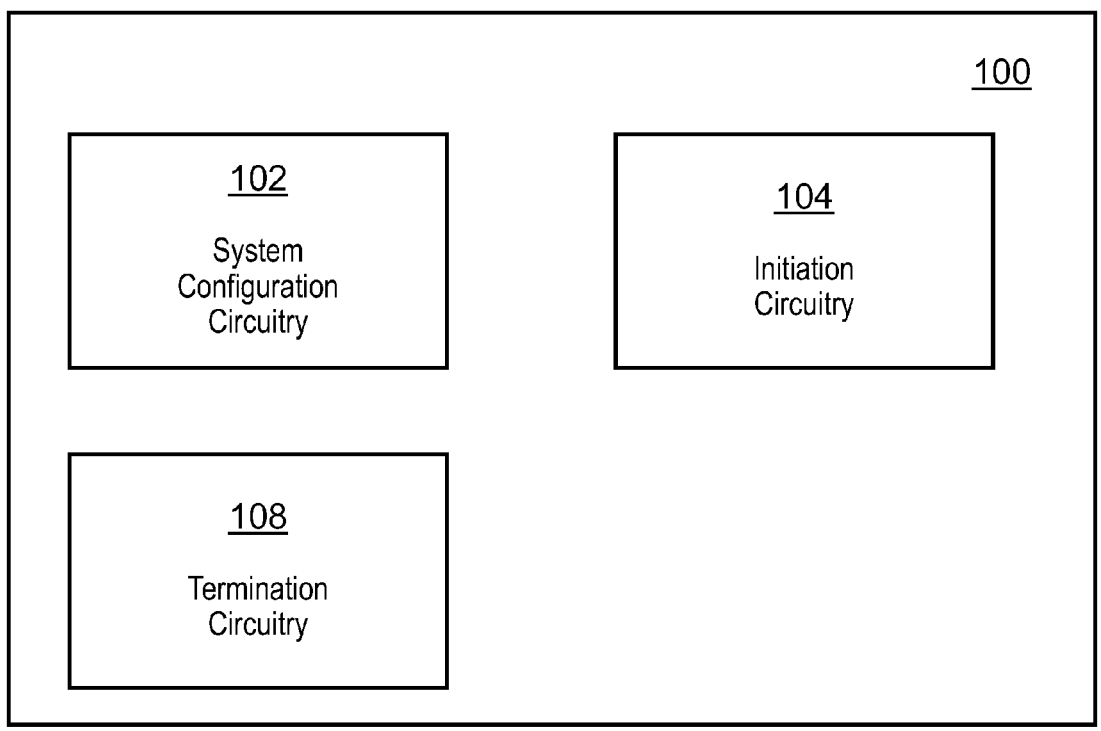
FIG. 9 is a block diagram representing one example of an inter-cell interference mitigation signalling apparatus.

FIG. 9 is a block diagram representing a rudimentary example of an ICIM signalling apparatus 100. The apparatus 100 includes the system configuration circuitry 102, initiation circuitry 104 and termination circuitry 108.

Figure 10:
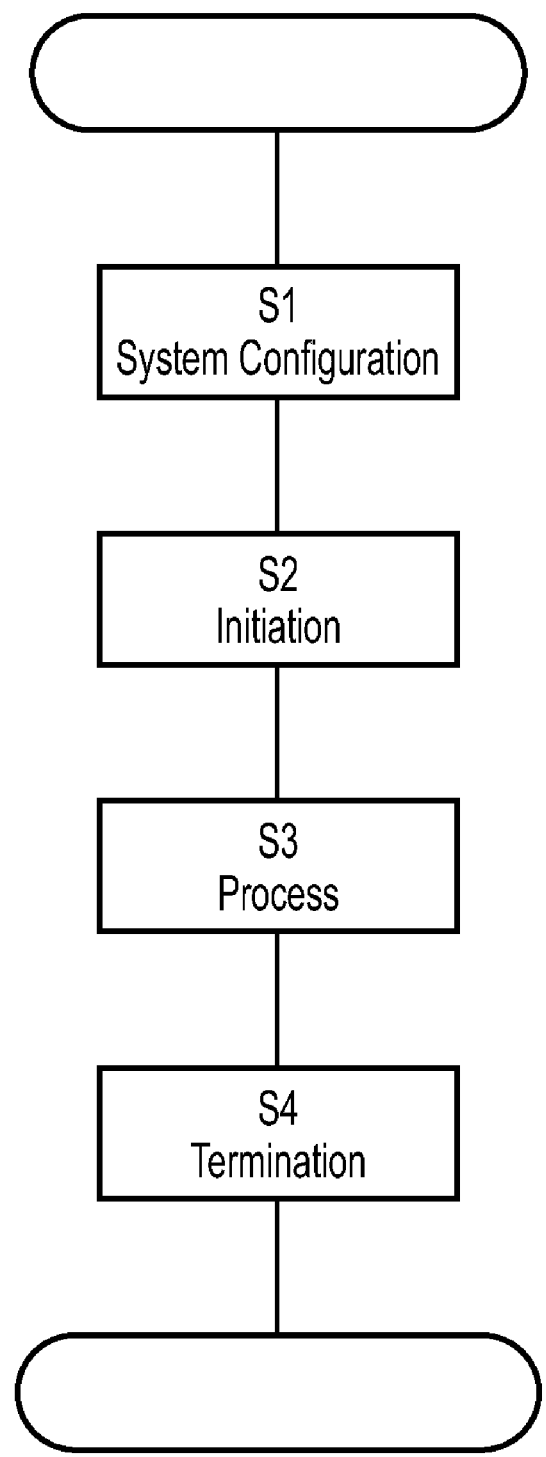
FIG. 10 is a block diagram representing another example of an inter-cell interference mitigation signalling method.

FIG. 10 is a flowchart representing a more detailed example of an ICIM signalling method. The method includes the operations S1, S2 and S4 of FIG. 8 in addition to an operation S3 of performing a process stage, which occurs after the initiation procedure and before the termination procedure.

Figure 11:
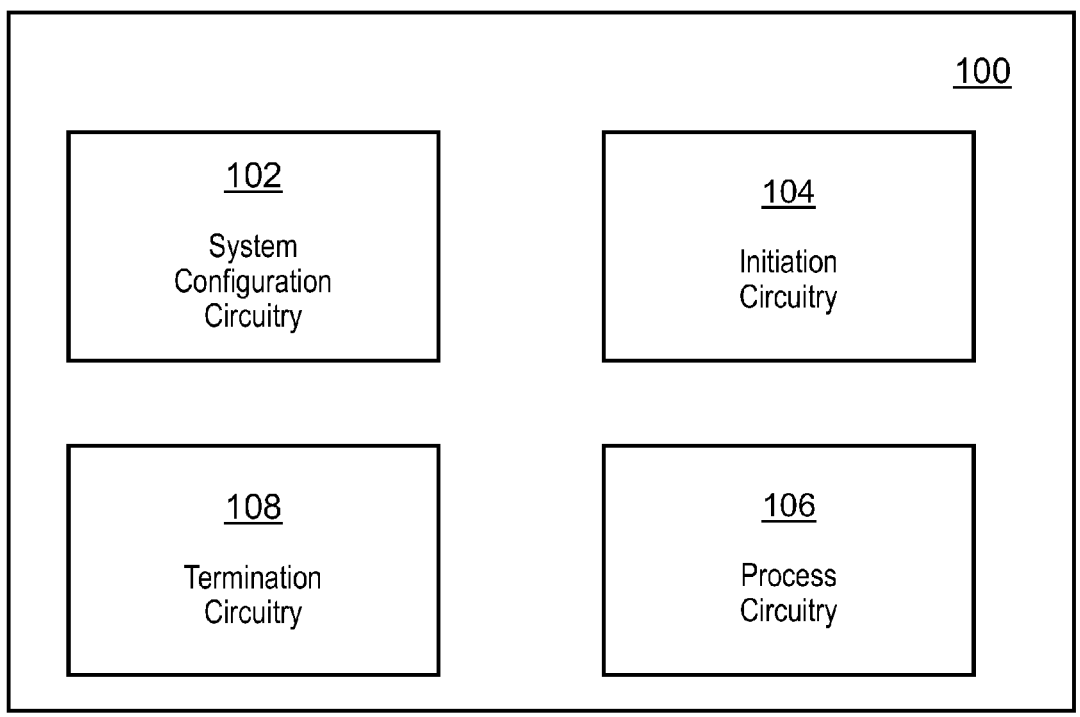
FIG. 11 is a block diagram representing another example of an inter-cell interference mitigation signalling apparatus.

FIG. 11 is a block diagram representing more detailed example of the signalling apparatus 100. In addition to the system configuration circuitry 102, initiation circuitry 104 and termination circuitry 108, the apparatus 100 further includes the process circuitry 106.

This invention may provide a solution on a MAC layer management work flow for inter-cell interference mitigation. With the work flow, which may consist of four phases, the wireless system can adopt any kind of inter-cell interference mitigation. Moreover, in each phase, the detailed implementation of the methods can be utilised in different scenarios.

The key benefits of the invention may be as follows:
A unified signalling framework to support any inter-cell interference mitigation method.
Reduction of the signalling overhead by using measurement feedback from the MS to the BS only when inter-cell interference mitigation is active.
Two types of BW allocations for MS reports on DL channel condition: high QoS feedback incurring additional overhead and low QoS feedback incurring no additional overhead.
Two types of unique BW allocation for MS reports on DL channel condition: periodic allocation with high flexibility and fixed allocation with low overhead.
Three types of ICIM termination origination schemes: MS origination, BS origination and automatic termination. With all of these schemes, the system can terminate ICIM in a timely and proper way.
Two types of ICIM cancellation request methods for MS origination case: the explicit and implicit. The explicit scheme could be used for any case of ICIM method. While for the ICIM methods which need ICIM report from the MS, the implicit scheme can reduce overhead.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for controlling the use of a plurality of inter-cell interference mitigation methods during wireless communications between a first wireless communications apparatus and a second wireless communications apparatus, the method comprising
performing a system configuration procedure wherein the first and second wireless communication apparatuses communicate to determine which of the plurality of inter-cell interference methods each apparatus supports and one or more mutually supported inter-cell interference mitigation methods are selected for use during the wireless communications between the first wireless communications apparatus and the second wireless communications apparatus;
performing an initiation procedure to start the use of the one or more selected inter-cell interference mitigation methods in response to the meeting of predetermined initiation criteria; and
performing a termination procedure to end the use of the one or more selected inter-cell interference mitigation methods in response to the meeting of predetermined termination criteria.

2. The method of claim 1 wherein performing the system configuration procedure comprises the first wireless communications apparatus transmitting a broadcast message to the second wireless communications apparatus, the broadcast message identifying one or more available inter-cell interference mitigation methods for use during the wireless communications.

3. The method of claim 2 wherein the broadcast message further identifies the predetermined initiation criteria, the predetermined initiation criteria specifying at least one parameter to be measured by the second wireless communications apparatus and further specifying a respective trigger threshold value associated with the or each parameter, the or each parameter being further associated with a respective selected inter-cell interference mitigation method, wherein the second wireless communications apparatus is to request the start of the use of a said selected inter-cell interference mitigation method in response to the measured value of the associated parameter rising above or falling below the associated trigger threshold value.

4. The method of claim 3 wherein the parameter to be measured by the second wireless communications apparatus is a preamble signal-to-interference-noise-ratio or a data region signal-to-interference-noise-ratio, and the second wireless communications apparatus transmits an identifier or other measurement pertaining to a third wireless communications apparatus which is causing interference.

5. The method of claim 3 or 4 wherein the predetermined initiation criteria additionally specify one or more trigger averaging durations associated with one or more respective trigger threshold values, the or each trigger averaging duration specifying the time duration over which the second wireless communications apparatus is to average the measured value before applying the threshold, wherein the second communications apparatus is to request the start of the use of the said selected inter-cell interference mitigation method in response to the averaged measured value of the associated parameter rising above or falling below, as appropriate, the associated trigger threshold value.

6. The method of claim 1 wherein performing the initiation procedure comprises the second wireless communications apparatus transmitting a request message to the first wireless communications apparatus in response to the predetermined initiation criteria being met, and the first wireless communications apparatus transmitting a response message to the second wireless communications apparatus, in response to the receipt of the request message, to indicate whether or not the request is granted.

7. The method of claim 6 wherein performing the initiation procedure comprises, in the case that one or more of the selected inter-cell interference mitigation methods requires the second wireless communications apparatus to transmit inter-cell interference mitigation method reports to the first wireless communications apparatus, the first wireless communications apparatus allocating bandwidth to the second wireless communications apparatus for transmitting the reports.

8. The method of claim 7, wherein allocating bandwidth comprises the first wireless communications apparatus transmitting a bandwidth allocation message to the second wireless communications apparatus, the bandwidth allocation message identifying bandwidth for use specifically by the second wireless communications apparatus.

9. The method of claim 8, wherein transmitting the bandwidth allocation message comprises transmitting the bandwidth allocation message periodically.

10. The method of claim 8, wherein transmitting the bandwidth allocation message comprises transmitting a single instance of the bandwidth allocation message, and transmitting information specifying a start time and period of the bandwidth allocation.

11. The method of claim 1, further comprising performing a process stage after the initiation procedure and before the termination procedure, during which the second wireless communications apparatus transmits inter-cell interference mitigation method reports to the first wireless communications apparatus as part of the one or more selected inter-cell interference mitigation methods.

12. The method of claim 11, wherein if one or more of the selected inter-cell interference mitigation methods requires the second wireless communications apparatus to transmit inter-cell interference mitigation method reports to the first wireless communications apparatus, the first wireless communications apparatus allocates bandwidth to the second wireless communications apparatus for transmitting the reports.

13. The method of claim 1 wherein the termination procedure comprises the second wireless communications apparatus transmitting a cancellation request message to the first wireless communications apparatus in response to the predetermined termination criteria being met.

14. The method of claim 13 wherein transmitting the cancellation request message comprises transmitting one or more blank inter-cell interference mitigation method reports.

15. The method of claim 1 wherein the predetermined termination criteria comprise failure by the second wireless communications apparatus to meet the predetermined initiation criteria.

16. The method of claim 1 wherein the termination procedure comprises the first wireless communications apparatus transmitting a cancellation response message to the second wireless communications apparatus in response to the predetermined termination criteria being met.

17. A system for controlling the use of a plurality of inter-cell interference mitigation methods during wireless communications between a first wireless communications apparatus and a second wireless communications apparatus, wherein the system is configured to
- communicate between the first and second wireless communication apparatuses to determine which of the plurality of inter-cell interference methods each apparatus supports,
- select one or more inter-cell interference mutually supported mitigation methods for use during the wireless communications between the first wireless communications apparatus and the second wireless communications apparatus;
- start the use of the selected one or more inter-cell interference mitigation methods in response to the meeting of predetermined initiation criteria; and
- end the use of the selected one or more inter-cell interference mitigation methods in response to the meeting of predetermined termination criteria.

18. An inter-cell interference mitigation signaling apparatus adapted to control the use of a plurality of inter-cell interference mitigation methods during wireless communications between a first wireless communications apparatus and a second wireless communications apparatus, the apparatus comprising
- system configuration circuitry adapted to perform a system configuration procedure wherein the first and second wireless communication apparatuses communicate to determine which of the plurality of inter-cell interference methods each apparatus supports and one or more mutually supported inter-cell interference mitigation methods are selected for use during the wireless communications between the first wireless communications apparatus and the second wireless communications apparatus;
- initiation circuitry adapted to perform an initiation procedure to start the use of the one or more selected inter-cell interference mitigation methods in response to the meeting of the predetermined initiation criteria; and
- termination circuitry adapted to performing a termination procedure to end the use of the one or more selected inter-cell interference mitigation methods in response to the meeting of predetermined termination criteria.

* * * * *